United States Patent
Mahler

(10) Patent No.: US 9,985,492 B2
(45) Date of Patent: May 29, 2018

(54) STATOR PRESSED WITH WINDING HEAD SUPPORT

(71) Applicant: Hilti Aktiengesellschaft, Schaan (LI)

(72) Inventor: Thomas Mahler, Laage (DE)

(73) Assignee: Hilti Aktiengesellschaft, Schaan (LI)

(*) Notice: Subject to any disclaimer, the term of this patent is extended or adjusted under 35 U.S.C. 154(b) by 0 days. days.

(21) Appl. No.: 14/743,586

(22) Filed: Jun. 18, 2015

(65) Prior Publication Data

US 2015/0288241 A1 Oct. 8, 2015

Related U.S. Application Data

(63) Continuation of application No. PCT/EP2013/076798, filed on Dec. 17, 2013.

(30) Foreign Application Priority Data

Dec. 20, 2012 (DE) .................. 10 2012 223 976

(51) Int. Cl.
*H02K 3/38* (2006.01)
*H02K 3/52* (2006.01)
*H02K 9/22* (2006.01)
*H02K 15/02* (2006.01)
*H02K 1/20* (2006.01)

(52) U.S. Cl.
CPC .............. *H02K 3/38* (2013.01); *H02K 3/522* (2013.01); *H02K 9/22* (2013.01); *H02K 15/02* (2013.01); *H02K 1/20* (2013.01); *Y10T 29/49009* (2015.01)

(58) Field of Classification Search
CPC ............. H02K 3/522; H02K 3/38; H02K 9/22
See application file for complete search history.

(56) References Cited

U.S. PATENT DOCUMENTS

| 3,436,569 | A | * | 4/1969 | Kimball, Jr. | ............. | H02K 1/16 |
| | | | | | | 310/216.131 |
| 3,688,137 | A | * | 8/1972 | Filhol | .................... | H01B 3/002 |
| | | | | | | 310/43 |
| 4,904,893 | A | * | 2/1990 | Snider | .................... | H02K 3/522 |
| | | | | | | 310/260 |

(Continued)

FOREIGN PATENT DOCUMENTS

| CN | 1380733 A | 11/2002 |
| DE | 596 337 | 4/1934 |

(Continued)

OTHER PUBLICATIONS

International Search Report in PCT/EP2013/076798 dated Oct. 30, 2014.

(Continued)

*Primary Examiner* — Dang Le

(74) *Attorney, Agent, or Firm* — McAndrews, Held & Malloy, Ltd.

(57) ABSTRACT

A stator for an electrodynamic machine, in particular an electric motor, contains a stator packet with a first stator end and a second stator end. Furthermore, the stator assembly contains at least one web insulation with at least one winding support element to accommodate a stator coil. A heat conductive support device with at least one support element is provided, whereby the support element is at least partially disposed in the winding support element.

7 Claims, 16 Drawing Sheets

(56) References Cited

U.S. PATENT DOCUMENTS

| | | | | |
|---|---|---|---|---|
| 6,445,095 B1* | 9/2002 | Liang | ................... | H02K 9/22 |
| | | | | 310/216.045 |
| 2010/0188181 A1* | 7/2010 | Urano | ................... | H02K 3/522 |
| | | | | 336/198 |
| 2010/0194214 A1* | 8/2010 | Takahashi | ............. | H02K 3/522 |
| | | | | 310/43 |
| 2011/0243768 A1 | 10/2011 | Taema | | |
| 2012/0169173 A1 | 7/2012 | Jang et al. | | |
| 2014/0319937 A1* | 10/2014 | Shirai | ................... | H02K 3/522 |
| | | | | 310/43 |

FOREIGN PATENT DOCUMENTS

| | | |
|---|---|---|
| DE | 10 2010 063304 | 2/2012 |
| EP | 2015426 A2 | 1/2009 |
| EP | 2 228 481 | 9/2010 |
| JP | 7111747 A | 4/1995 |
| JP | H07111747 A | 4/1995 |
| WO | 2009/029743 | 3/2009 |
| WO | 2012022566 A2 | 2/2012 |

OTHER PUBLICATIONS

German Search Report, German Application No. 10 2012 223 976.6, dated Apr. 18, 2016.
Chinese Office Action dated Mar. 14, 2017.

\* cited by examiner

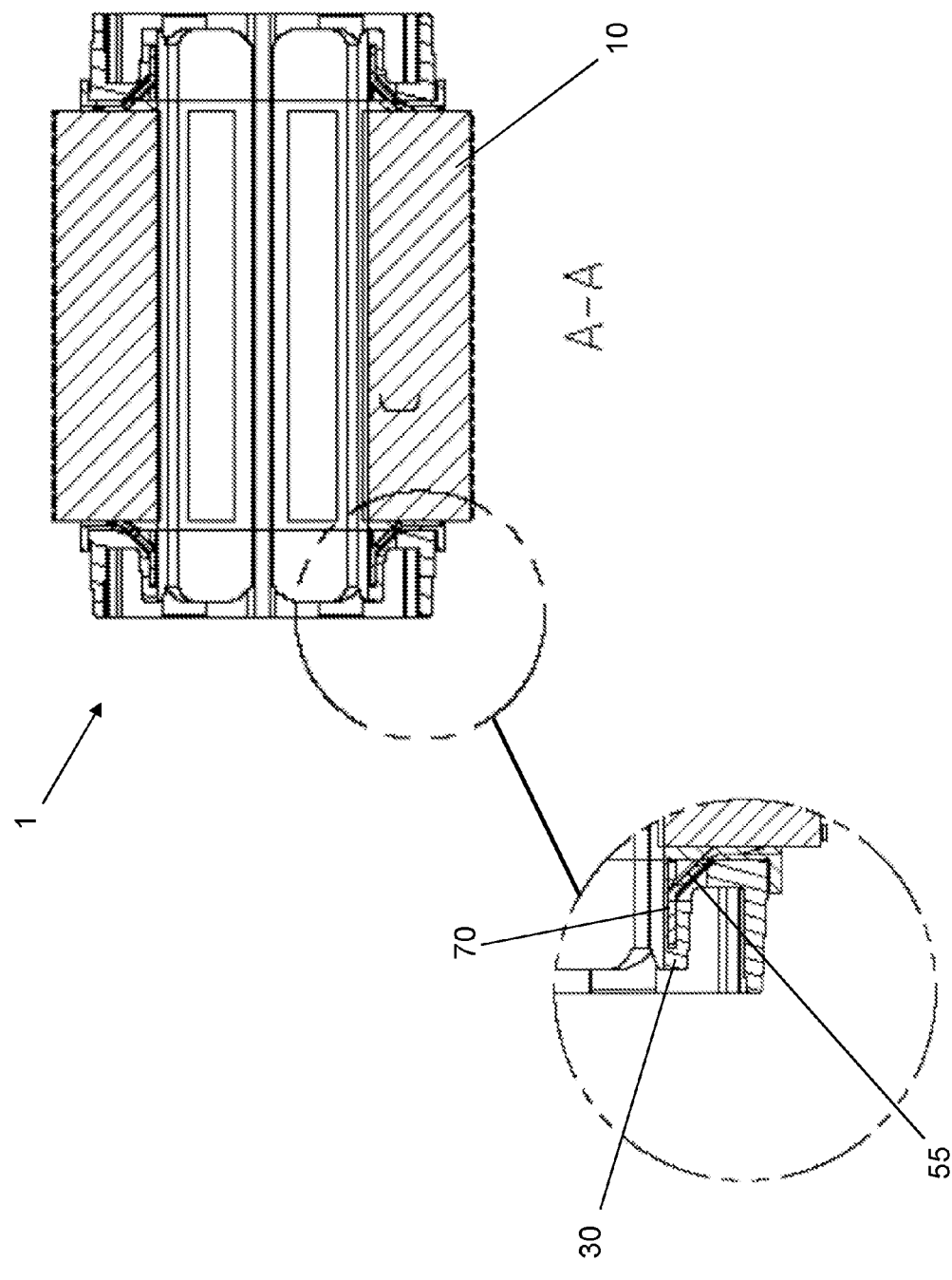

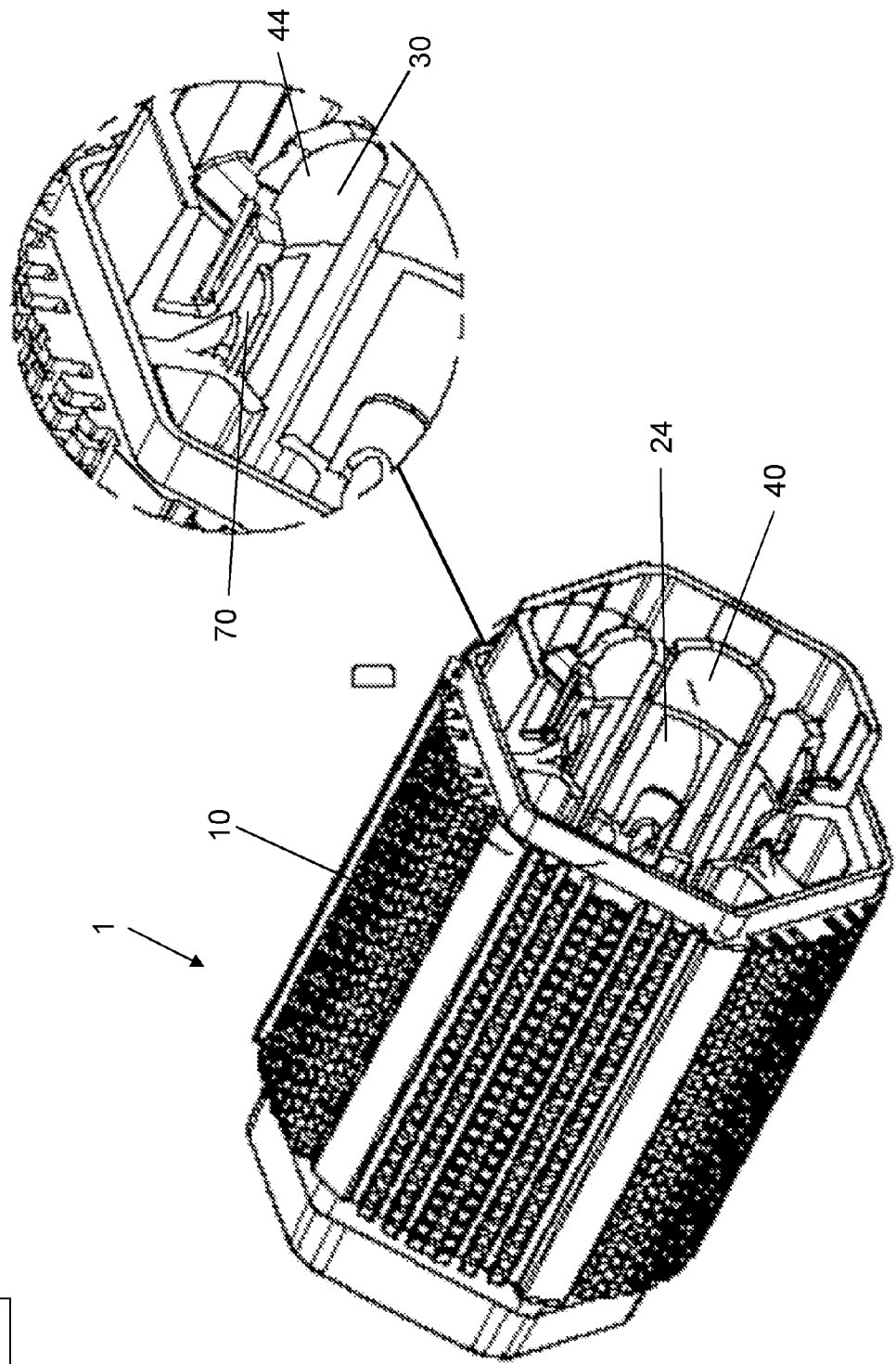

STATOR PRESSED WITH WINDING HEAD SUPPORT

RELATED APPLICATIONS

This application claims priority to, and is a continuation of, PCT Application No. PCT/EP2013/076798 having an International filing date of Dec. 17, 2013, which is incorporated herein by reference, and which claims priority to German Patent Application No. 10 2012 223 976.6, having a filing date of Dec. 20, 2012, which is also incorporated herein by reference] in its entirety.

SUMMARY OF THE TECHNOLOGY

The invention concerns a stator for an electrodynamic machine, in particular an electric motor. The stator comprises a stator packet with a first stator end and a second stator end. Furthermore, the stator packet comprises at least one web insulation with at least one winding support element to accommodate a stator coil.

BACKGROUND OF THE INVENTION

A stator or a stand for an electric motor typically consists of a stator packet, among other things. The stator packet is formed from individual sheet metal rings. For this purpose, the stator packet has a number of stator poles or webs, which extend radially into the interior of the stator. Between the individual stator poles there are gaps in the form of pole or winding grooves.

The inner surface of the stator, the stator poles (webs) and the pole grooves are usually overmolded or sheathed with a plastic. Alternatively, the pole grooves can also be insulated with paper. The plastic can, for example, be polymers, such as e.g. Duroplast or a thermoplastic. The plastic overmolding thereby forms the actual winding supports around each individual stator pole, which serve to accommodate the stator coils.

A stator of this type is known from the EP Patent Specification 2 015 426. This document pertaining to the state of the art discloses a stator for a drive device of a hand tool, such as a cordless screwdriver. In this case, the stator exhibits two axial stator ends, on each of which a connecting element, such as an end shield or a cap, is disposed. In its interior the stator further has multiple radially inward extending webs, which extend across the entire length of the stator and are separated by winding grooves. A stator winding, i.e. a stator coil, is attached around the webs. A groove insulation is provided between the webs and the stator winding.

The high wire tension necessary for the winding of the stator coils, can lead to a deformation of the winding supports on the ends of the stator packet. The high wire tension can also cause the winding supports to break.

In order to meet the requirements of the winding process, in particular the requirements of high wire tension, only thermoplastic materials with a high modulus of elasticity (E modulus) are currently used to manufacture the winding supports. When using thermoplastic materials, however, there may be relatively severe deformation of the winding support due to the high wire tension of the winding. Although higher filled plastics exhibit higher rigidity for use as winding supports, under the load of the wire tension, fractures in the winding supports eventually occur with these materials as well.

In addition, the heat conductivity of the materials commonly used for the winding supports poses a problem. To counteract overheating within the stator packet, the heat generated in the stator coils by the alternating current (induction heating) must, for example, be conducted over the winding supports to the outer surface of the stator packet. Plastics with optimized heat conductivity often do not satisfy the requirements of the winding process, because they too are deformed by the high wire tension or even break. The more or less only available thermoplastic materials with an optimized heat conductivity also exhibit limitations in terms of flow distance and the dependent (requisite) minimum wall thicknesses. Larger wall thicknesses are often implemented in the winding supports to counteract these limitations, which in turn, however, results in poor heat dissipation from the stator coils over the thermoplastic to the stator packet.

SUMMARY OF THE INVENTION

One task of the present invention is to solve the problems mentioned above and thus provide a stator which meets the requirements of the winding process, in particular the high wire tension, and at the same time ensures better heat dissipation for the stator.

This task is solved according to the invention by a stator for an electrodynamic machine, in particular an electric motor. The stator comprises a stator packet with a first stator end and a second stator end. In addition, the stator comprises at least one web insulation with at least one winding support element to accommodate a stator coil.

According to the invention, a heat conductive support device with at least one support element is provided, whereby the support element is disposed at least partially in the winding support element.

In accordance with an alternative version of the present invention, the heat conductive support device can also be configured for use in an electrodynamic machine designed as an external rotor, in particular an electric motor.

According to an advantageous embodiment of the present invention it can be provided that each support element comprises a first section as well as a second section, whereby the first section substantially extends in a first plane, and the second section substantially extends in a further plane perpendicular to the first plane and in the direction of a stator end.

The perpendicular sections of the support element ensure the support of the winding support elements against the occurring wire tension forces of the winding, both in radial as well as in axial orientation.

In order to prevent the first section and the second section of the support element from bending relative to one other, a stiffening element can be provided between the first section and the second section. The stiffening element can be configured in the form of additionally applied material between the first and second sections. In addition, the stiffening element can also be configured as an equivalent stiffening rib or stiffening recess.

According to another alternative embodiment, each support element can be configured in the form of a curved contour, whereby in each case a free end of the support element extends in the direction of a corresponding stator end. With this particular configuration of the support element, a stress concentration in the interface between the first and second sections can effectively be avoided.

Another advantageous version of the present invention can consist in the heat conductive support device comprising at least one support device component, whereby each support device component comprises at least one support element. The support device thus does not exclusively consist of only a single constituent (i.e. component), but can, for example, be composed of multiple individual components, such as ring sections or sectors. Advantages in terms of the manufacturing of the stator according to the invention result from the configuration of the support device in the form of multiple support device components. This, in particular, allows the individual adjustment or alignment of the support elements in the winding support elements.

The heat conductive support device can preferably be configured substantially as an annular sheet metal element. This allows the heat conductive support device to be adapted to the contour of the cross section of the stator packet.

It is also possible, however, to realize the heat conductive support device as polygonal or polygonal sheet metal element.

It is also possible to realize the heat conductive support device as a frame, skeleton or supporting structure. Furthermore, it is also possible to design the heat conductive support device as a plate with a corresponding opening for the interior of the stator packet. As already described above, it is generally possible to construct the heat conductive support device of multiple individual or interconnected components.

It is also possible that the dimensions of the heat conductive support device extend beyond the outer contour of the stator packet, to provide, for example, a mount for the stator to the housing of an electric motor.

It is further possible for the heat conductive support device to consist of a number of different heat conductive materials, such as alloys or composite materials.

In a further embodiment of the present invention, the sheet metal element can be designed as a stamped and bent component. It is also possible, however, to use any other suitable manufacturing process.

The heat conductive support device can advantageously, be positioned substantially in the vicinity of a stator end. The forces occurring due to winding are generally the greatest at the axial ends of the winding support elements, i.e. in the vicinity of the first stator end. Positioning the heat conductive support device in this area is therefore the most effective. It is also possible, in addition to a first heat conductive support device, or instead of a first heat conductive support device, to position a second heat conductive support device in the vicinity of the other stator end.

To make the support device particularly resistant to the wire tension forces of the winding, i.e. to particularly high wire tension forces, the heat conductive support device can consists of a high-strength material.

Alternatively, it is also possible for the support device to not be realized as one single separate component. The stator according to the invention can also be created by a manufacturing method with a number of spraying or application steps. For this purpose, a layer of heat conductive plastic or composite material is first sprayed on or applied to the interior of the stator packet. In a next process step, a layer of high-strength plastic or composite material, which fulfils the function of the support device, is sprayed on or applied. Subsequently, a third layer is sprayed on or applied, which again consists of a heat conductive plastic or composite material.

Optionally the stator according to the invention can also be manufactured by mounting the support device as a separate component on the front side of the stator packet. Subsequently the web insulation, in the form of a heat conductive and/or a high-strength plastic or composite material, is at least partially sprayed on or applied over the support device.

According to a further alternative manufacturing method for the stator according to the invention, the support device can be sprayed on or applied in the form of a high-strength plastic or composite material on the front side of the stator packet. Here the subsequently to be added web insulation is configured as a prefabricated separate component which can be fitted on the support device, as well as on the front side of the stator packet. For this purpose the support device, and/or the front side of the stator packet, exhibits a corresponding mounting fixture.

According to a further possible manufacturing method for the stator according to the invention, the web insulation is configured as a prefabricated separate component already exhibiting a corresponding support device as an at least partially integrated component. The web insulation can be fitted onto the front side of the stator packet as a module together with the integrated support device. For this purpose the front side of the stator packet again exhibits a corresponding mounting fixture.

BRIEF DESCRIPTION OF SEVERAL VIEWS OF THE DRAWINGS

Additional advantages are evident from the following description of the drawing. The drawing shows a design example of the present invention. The drawing, the description and the claims contain numerous features in combination. A skilled person will expediently consider the features individually as well, and combine them to further useful combinations.

FIG. 15 is a sectional view along line A-A of FIG. 14 with a detailed view of the arrangement of the support device in the web isolation.

FIG. 16 is a perspective view of the stator according to the invention with the web insulation and a detailed view of the arrangement of the support device in the web isolation.

DETAILED DESCRIPTION

Figure 1:
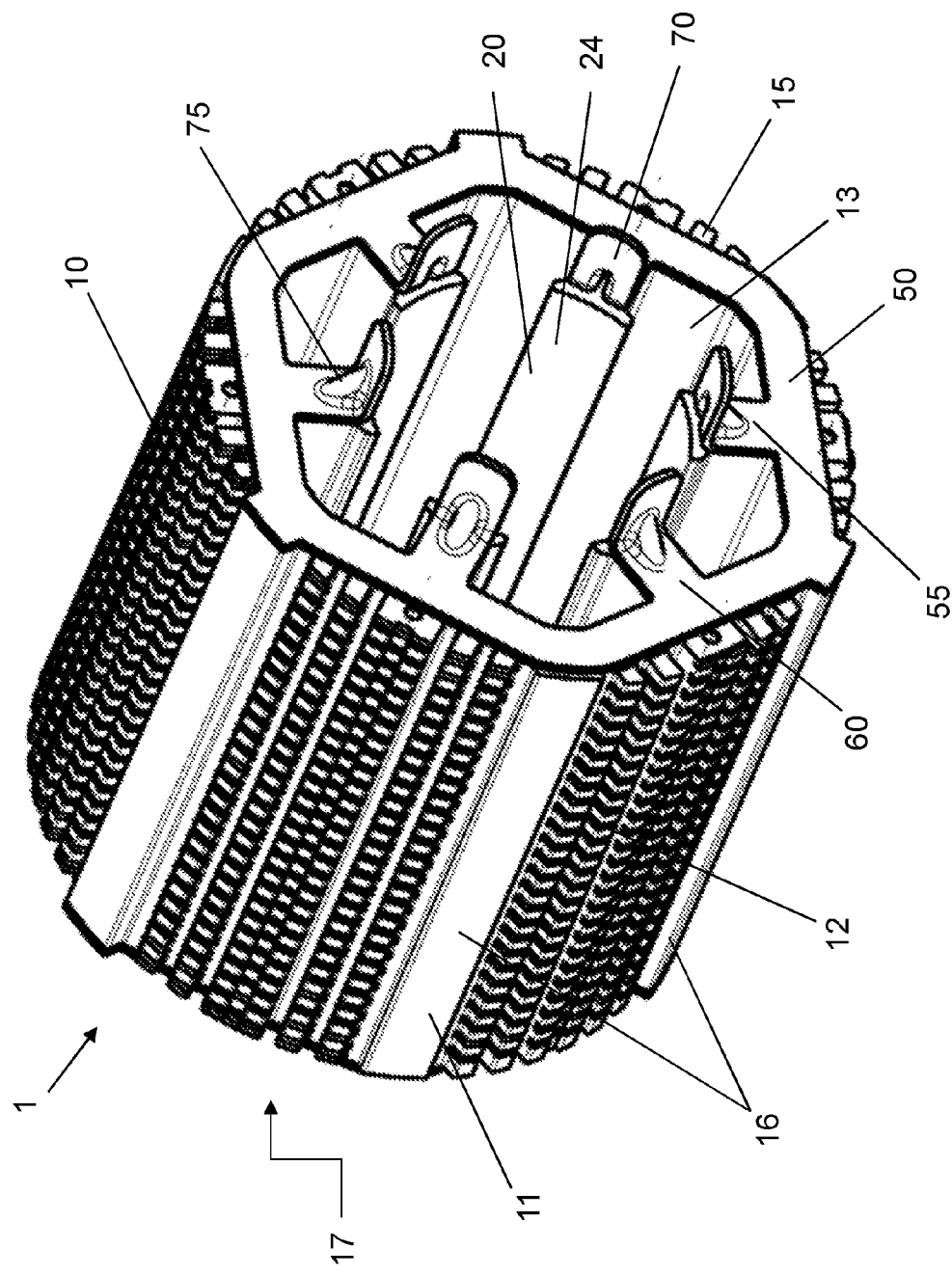
FIG. 1 is a perspective view of a stator according to the invention with a stator packet and a heat conductive support device.

FIG. 1 shows a stator 1 for an electrodynamic machine, in particular for an electric motor.

The stator 1 substantially consists of a stator packet 10, a web insulation 30 and a heat conductive support device 50.

The stator packet 10 is made up of several individual sheet metal rings 12, which are fixedly connected to one another, whereby the stator 1 and the stator packet 10 are given a substantially cylindrical shape. In addition, the stator packet 10 exhibits an outer surface 11, an inner surface 13, as well as a first stator end 15 and a second stator end 17.

The individual sheet metal rings 12 exhibit a hexagonal shape, whereby the respective corners 16 on the inner side and outer side of the sheet metal ring 12 are rounded.

The sheet metal rings 12 also include six web elements 20, which are disposed evenly distributed on the inner side of the sheet metal rings 12 and extend radially toward the interior of the sheet metal ring 12. When the individual sheet metal rings 12 are connected to the stator packet 10, the individual web elements 20 together form six continuous webs 24, which extend along the inner surface 13 of the stator packet 10 across the entire length of the stator packet 10.

Due to the hexagonal shape of the sheet metal rings 12, the stator packet 10 receives the form of a cylindrical hexagonal tube with a central passage opening 25.

Figure 13:
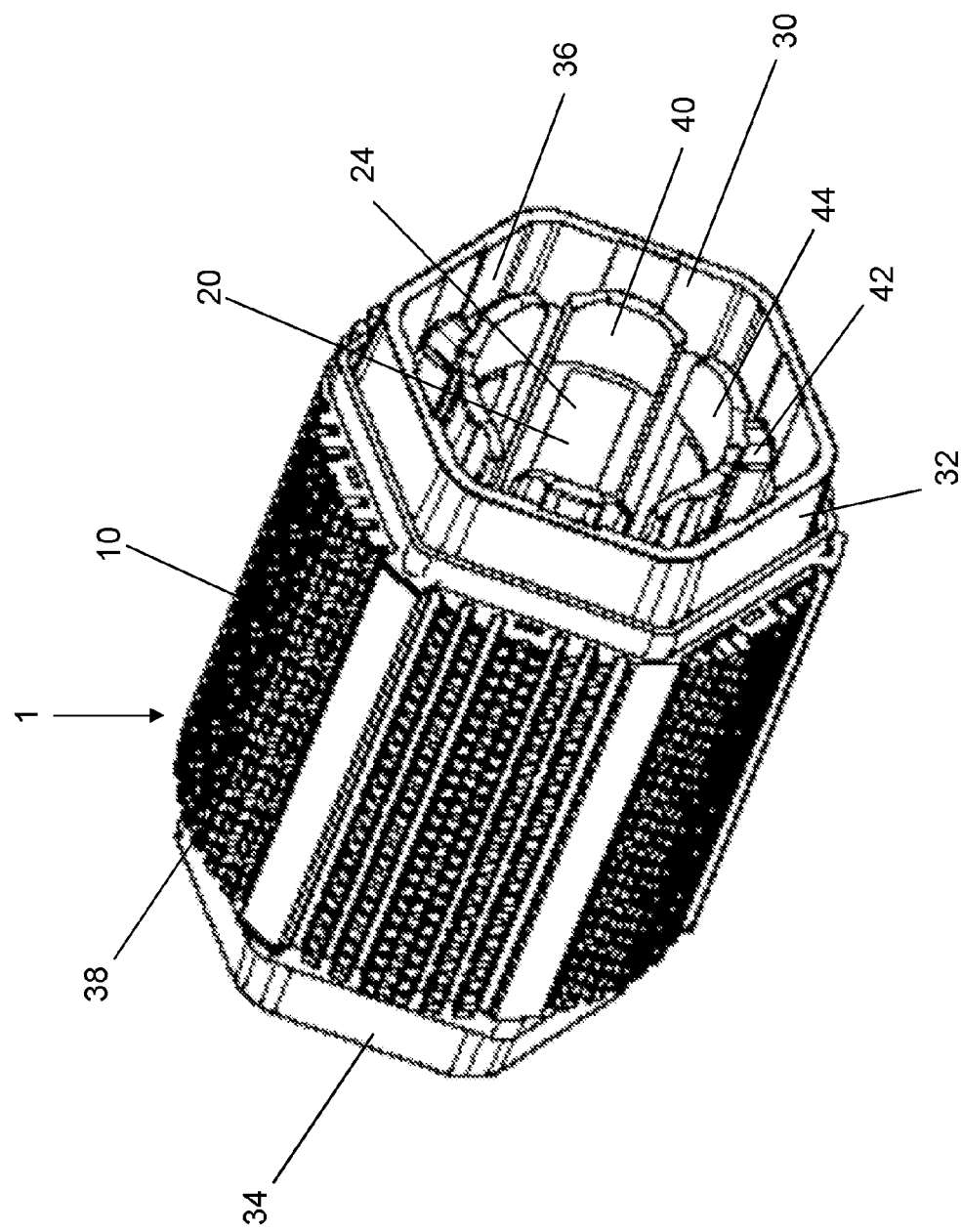
FIG. 13 is a perspective view of a stator according to the invention with a stator packet and a web insulation.
Figure 14:
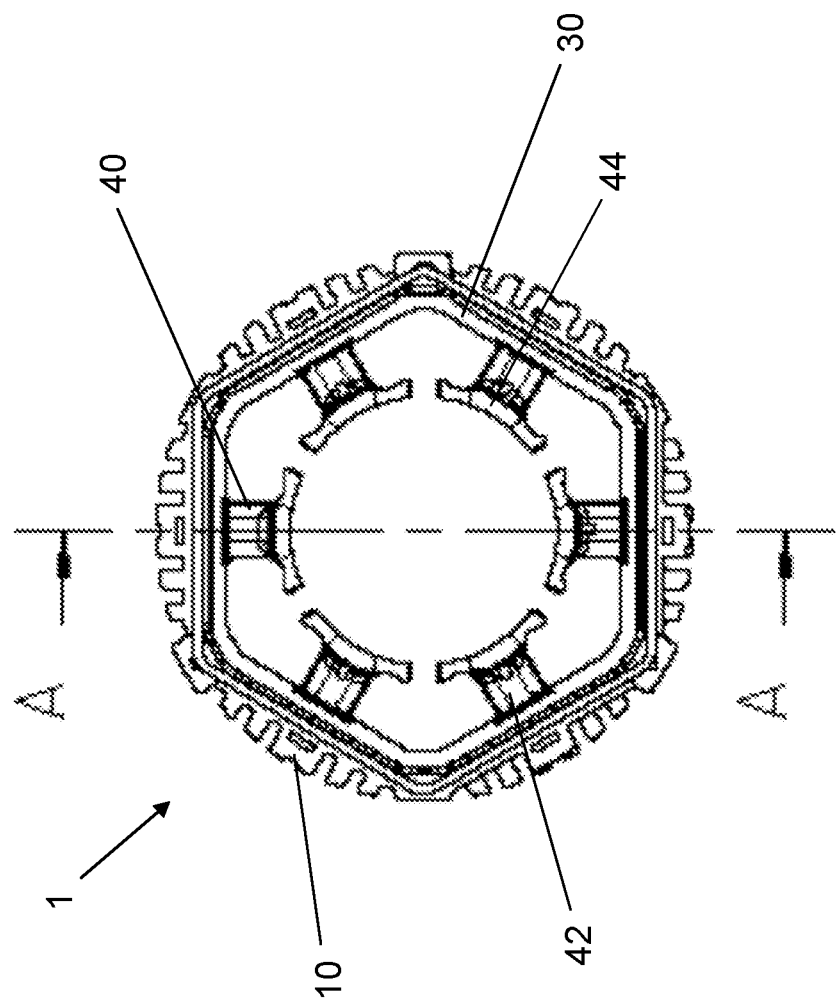
FIG. 14 is a front view of a stator according to the invention with a stator and a web insulation.

As shown in FIG. 13, the web insulation 30 is also in the form of a cylindrical hexagonal tube with a first end 32, a second end 34, an inner surface 36 and an outer surface 38. On the inner surface 38, the web insulation 30 exhibits six uniformly distributed winding support elements 40, which extend radially to the interior of the web insulation 30. The winding support elements 40 surround the webs 24 of the stator packet 10 and exhibit an elongated base body 42 with a carrier plate 44. Each winding support element 40 is respectively wrapped with a not depicted wire (e.g. copper wire) to form a stator coil 10. The not depicted wire is wrapped several times around the elongated base body 42 and below the carrier plate 44 of the winding support element 40.

Figure 4:
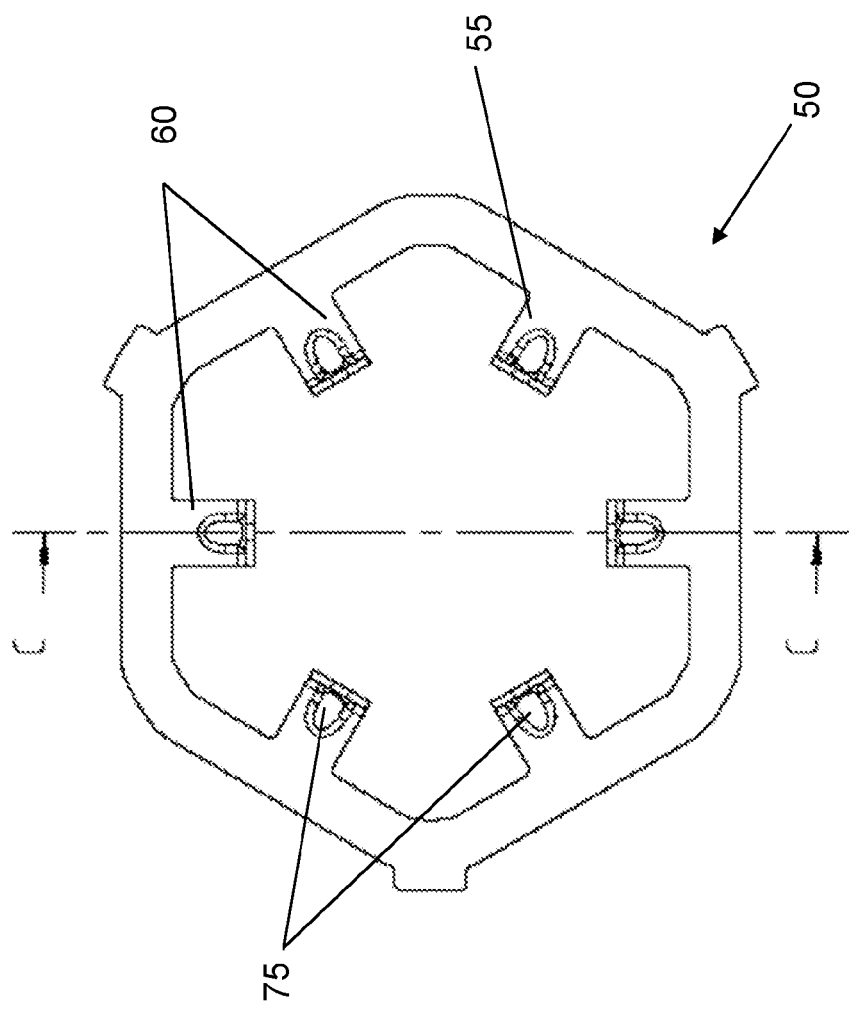
FIG. 4 is a front view of the heat conductive support device according to a first embodiment.
Figure 5:
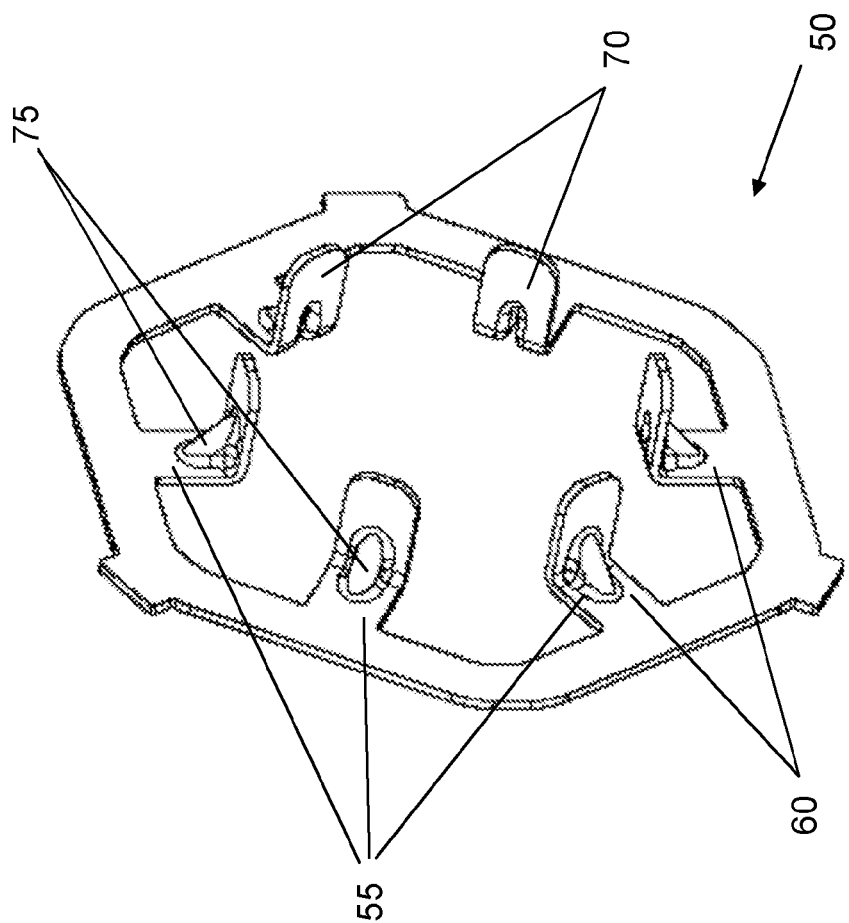
FIG. 5 is a perspective view of the heat conductive support device according to the first embodiment.
Figure 6:
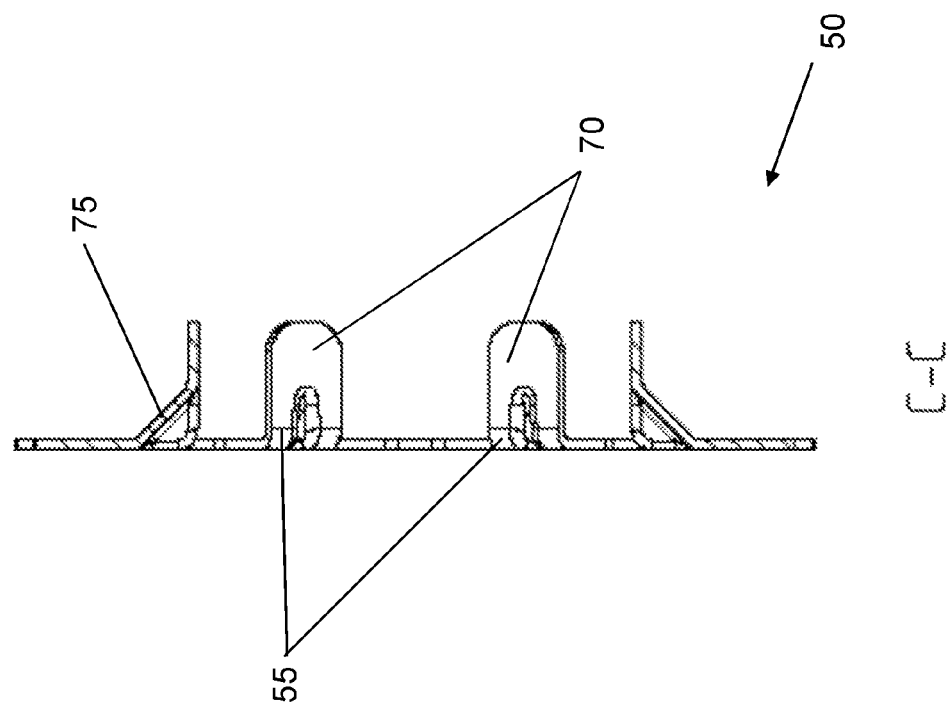
FIG. 6 is a sectional view along line C-C of FIG. 4.
Figure 7:
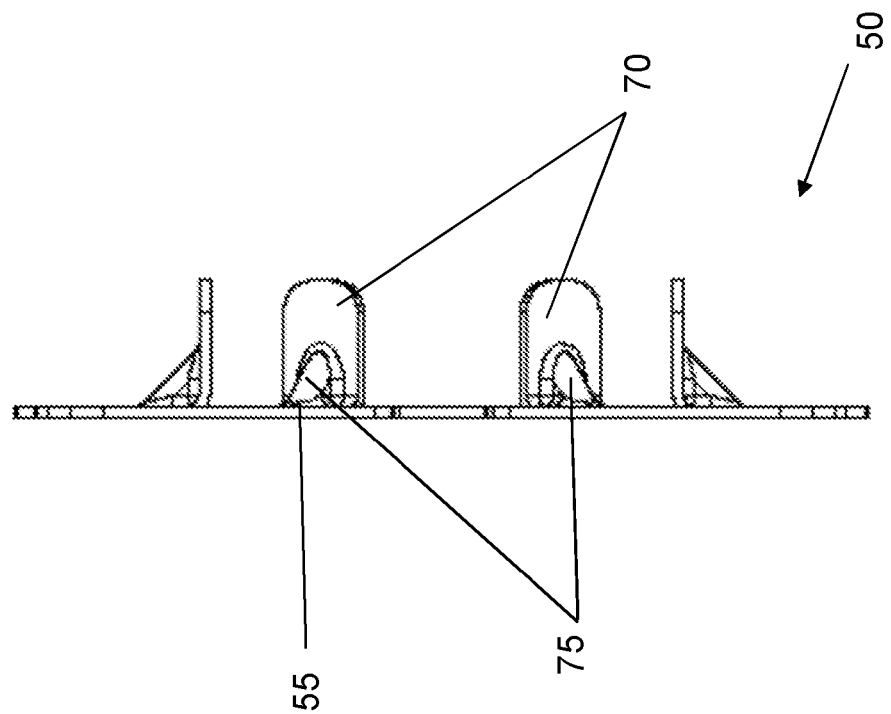
FIG. 7 is a side view of the heat conductive support device according to a first embodiment.

As shown in FIG. 4 and FIG. 7, the heat conductive support device 50 is configured as a separate sheet metal element.

According to a first embodiment of the heat conductive support device 50 as shown in FIG. 4, the support device 50 is configured in the form of a continuous hexagonal ring 51 with an inner side 52 and an outer side 54. The respective corners of the ring 51 are rounded on both the inner side 52 and the outer side 54. The heat conductive support device 50 in turn comprises six individual support elements 55, which are disposed uniformly distributed between the corners on the inner side 52 of the heat conductive support device 50 and extend radially toward the interior of the heat conductive support device 50. The support elements 55 again consist of a first section 60 and a second section 70. The first section 60 extends in the same plane as ring 51 of the heat conductive support device 50. The second section 70 extends perpendicular to the first section 60 and faces toward the first front side 16 of the stator pack 10, see FIGS. 1 and 3. Stiffening elements 75, which are configured in the form of a stiffening recess, are positioned between the first section 60 and the second section 70 to prevent bending of the first section 60 relative to the second section 70.

Figure 8:
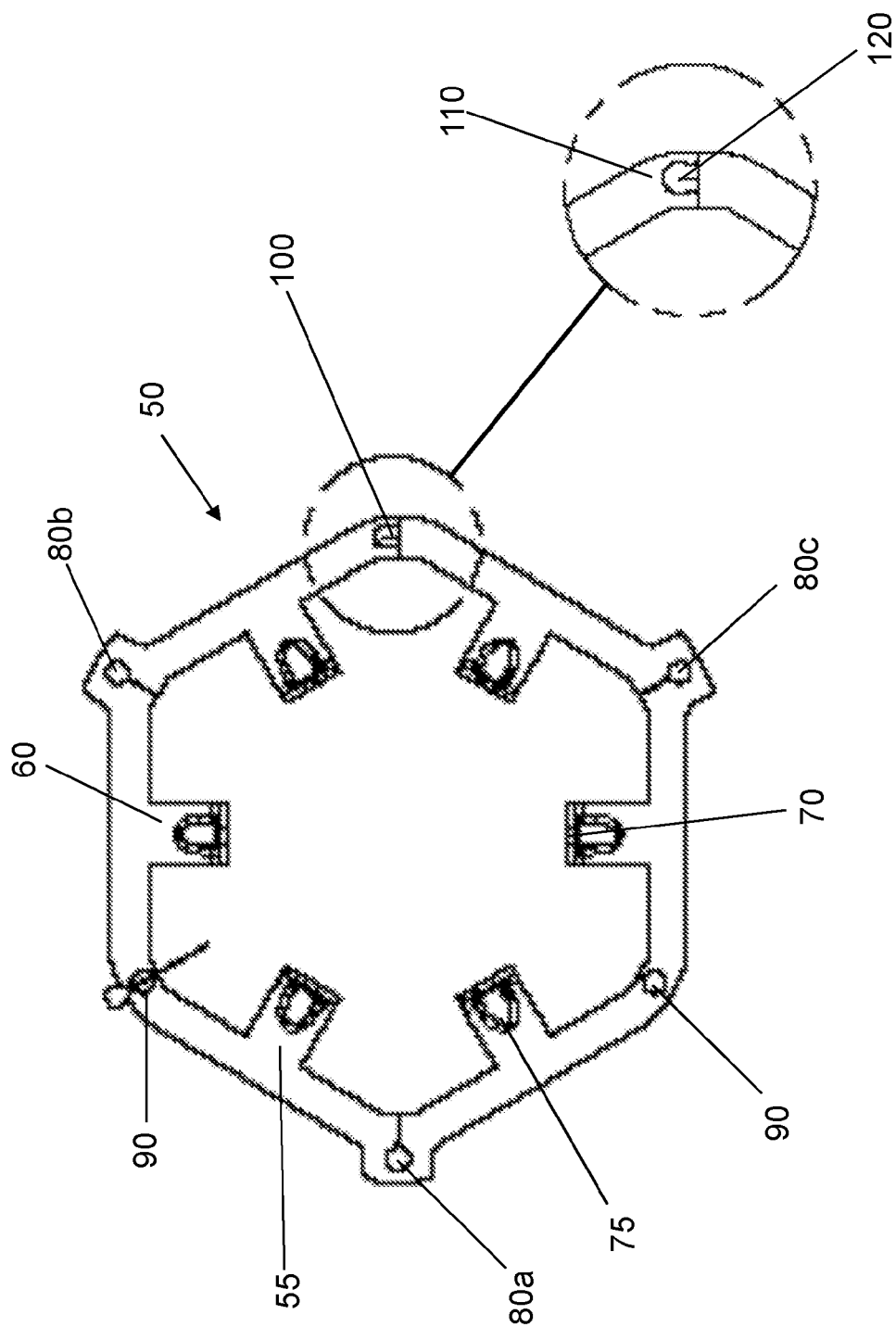
FIG. 8 is a front view of the heat conductive support device according to a second embodiment.
Figure 9:
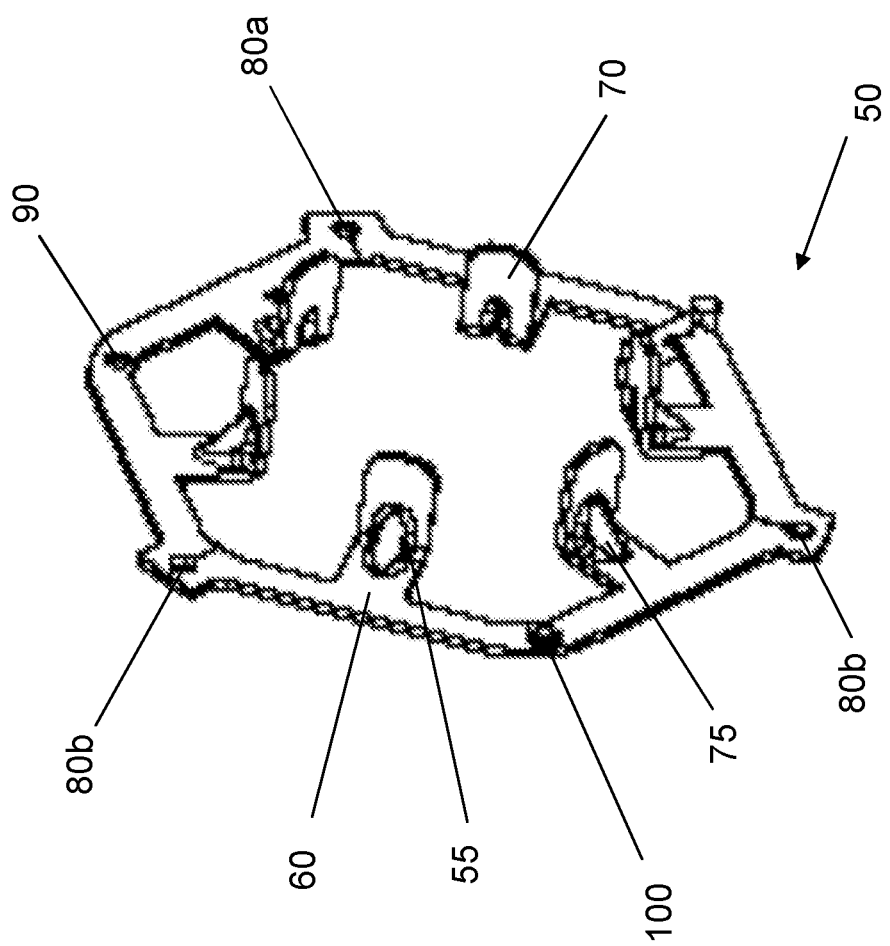
FIG. 9 is a perspective view of the heat conductive support device according to a second embodiment.

FIGS. 8 and 9 show a second version of the heat conductive support device 50, in which the sheet metal element is configured as in the first version of the heat conductive support device 50. The second version of the heat conductive support device 50 also exhibits six support elements 55 each with a first section 60 and a second section 70. In addition, the second version of the heat conductive support device 50 exhibits three bending points 80a, 80b, 80c, two recesses 90 and a closure device 100. The closure device 100 comprises an accommodation element 110 and an insert element 120. The insert element 120 is configured in such a way that it can be accommodated in the accommodation element 110 and can be held by it.

To manufacture the second version of the heat conductive support device 50, the support device 50 is initially in a straight, not sealed state. To create a closed hexagonal ring from this support device 50, the support device 50 is deformed or bent around the bending point 80 in such a way that the insert element 120 is accommodated in the accommodation element 110 and held by it. The support device 50 is thus closed and thereby formed into a hexagonal ring. The recesses 90 aid in the deformation of the sheet metal ring 12 to a hexagonal ring. The support elements 55 with the first section 60 and second section 70 can be formed into a hexagonal ring before or after the deformation of the sheet metal ring 12.

Figure 10:
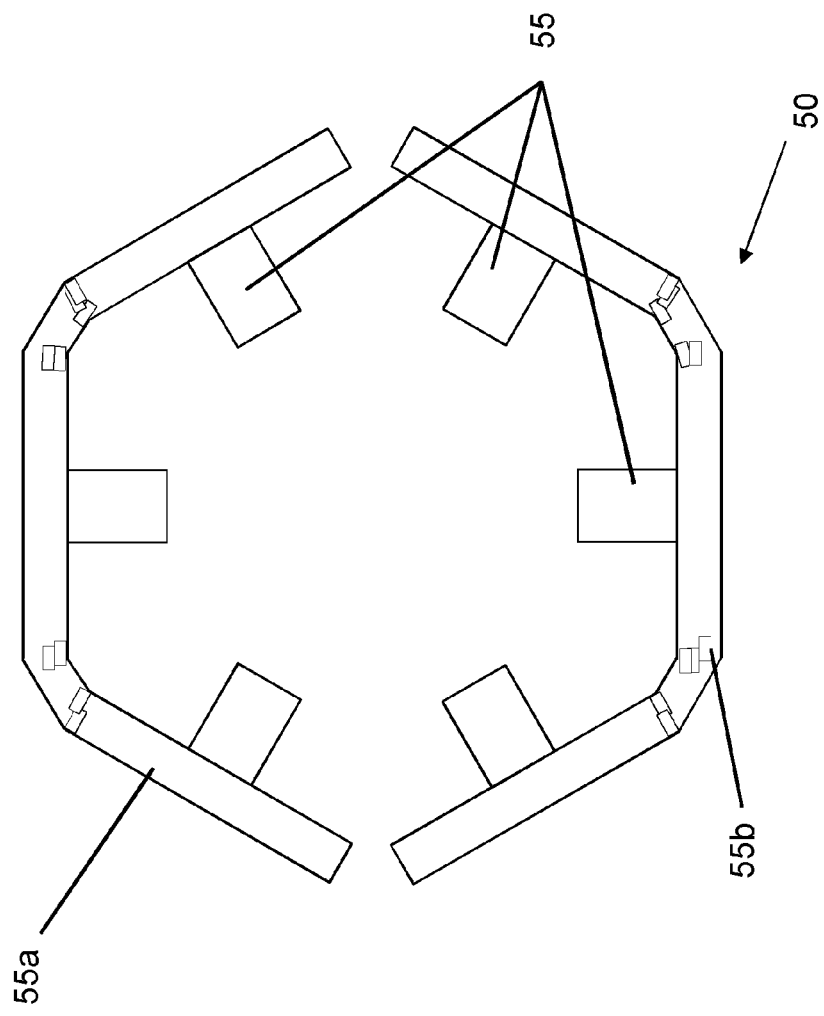
FIG. 10 is a front view of the heat conductive support device according to a third embodiment.
Figure 11:
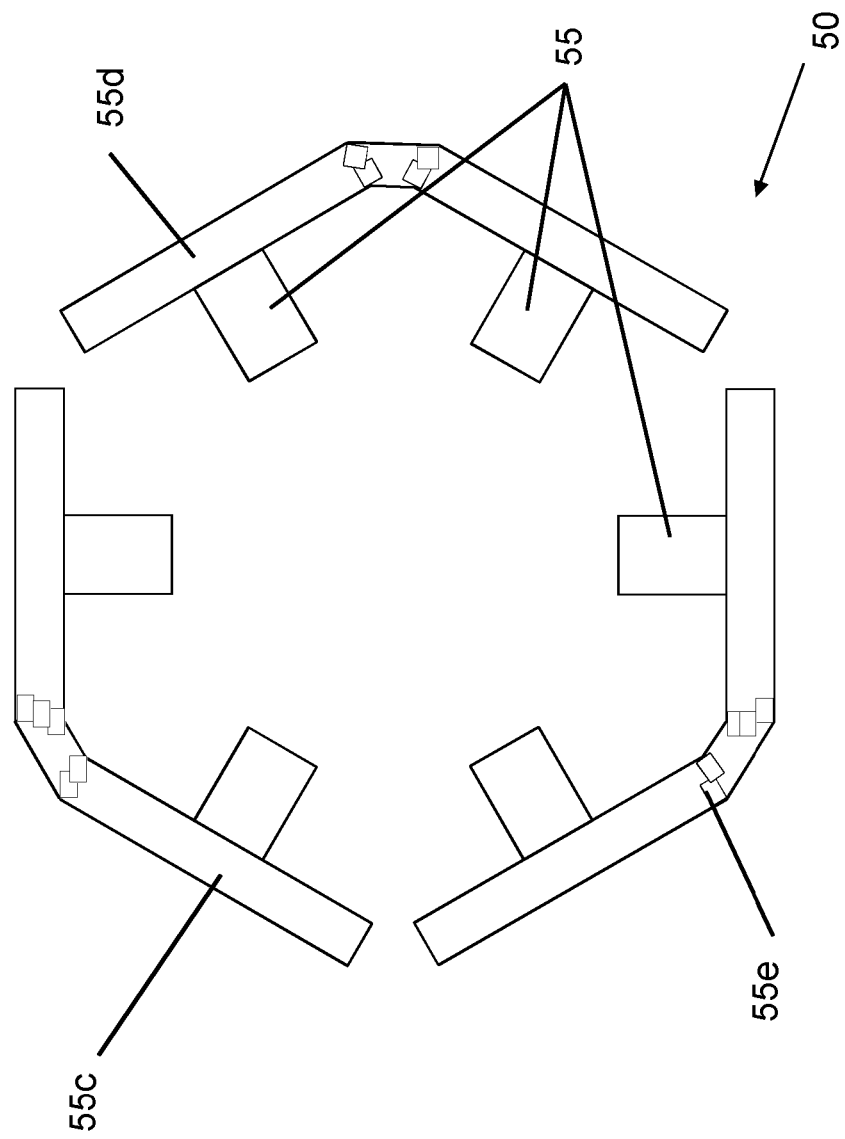
FIG. 11 is a front view of the heat conductive support device according to a fourth embodiment.
Figure 12:
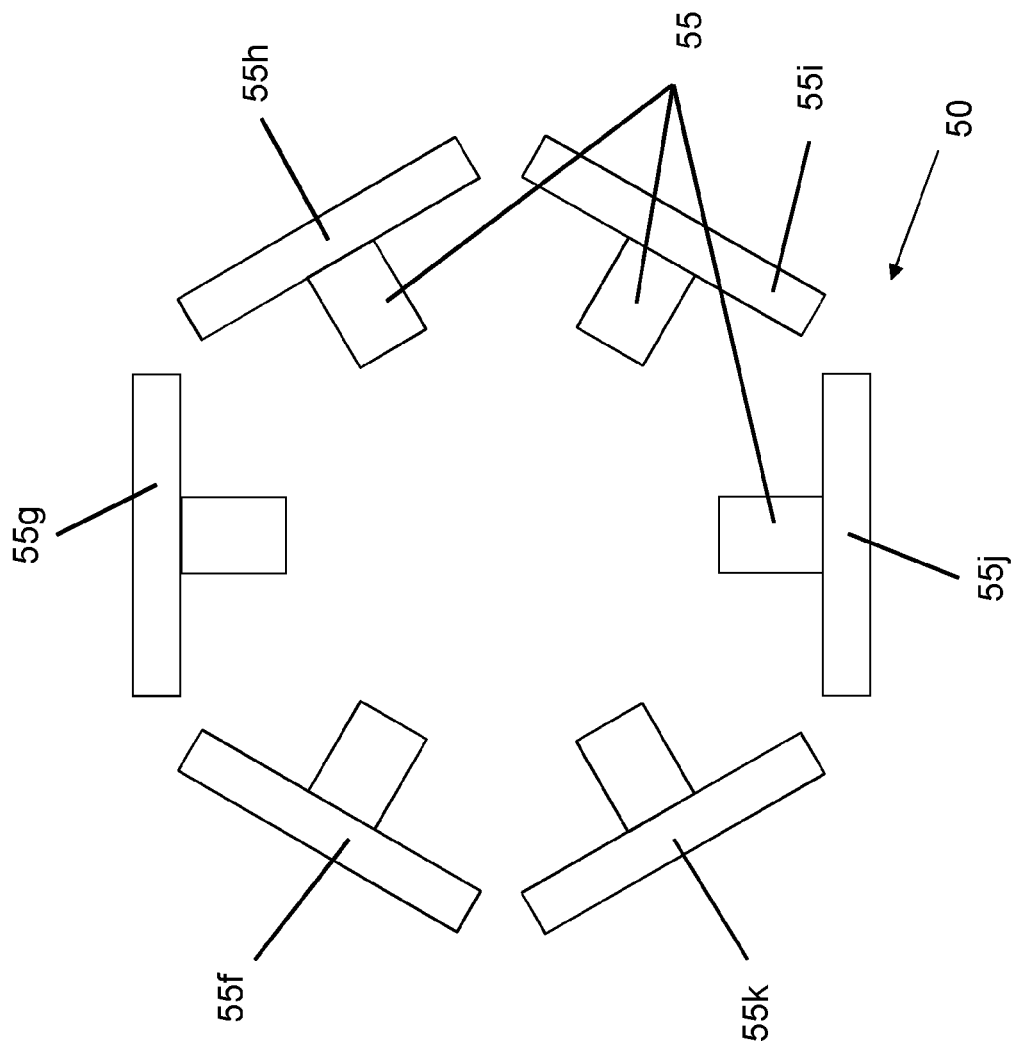
FIG. 12 is a front view of the heat conductive support device according to a fifth embodiment.

FIG. 10, FIG. 11 and FIG. 12 respectively show another version of the heat conductive support device 50 for a stator 1 according to the invention.

FIG. 10 shows a third version of the heat conductive support device 50, which consists of two individual support device components 50a, 50b, in the form of sheet metal elements. Each of the two sheet metal elements 50a, 50b contains a support element 55.

FIG. 11 discloses a fourth version of the heat conductive support device 50, which consists of three individual support device components 50c, 50d, 50e, in the form of sheet metal elements, each with two support elements 55.

FIG. 12 further shows a fifth version of the heat conductive support device 50, which consists of six individual support device components 50f, 50g, 50h, 50i, 50j, 50k, in the form of sheet metal elements, each in turn comprising six support elements 55.

Figure 2:
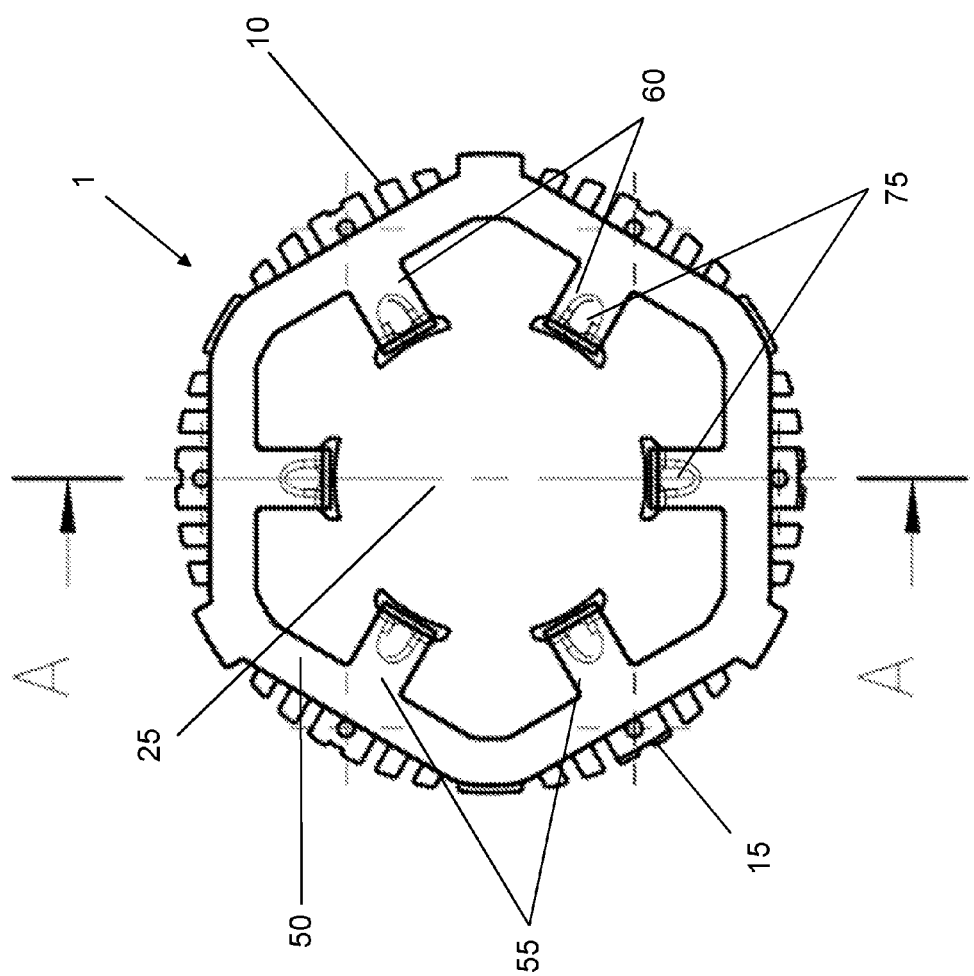
FIG. 2 is a front view of the stator according to the invention with the stator packet and the heat conductive support device.
Figure 3:
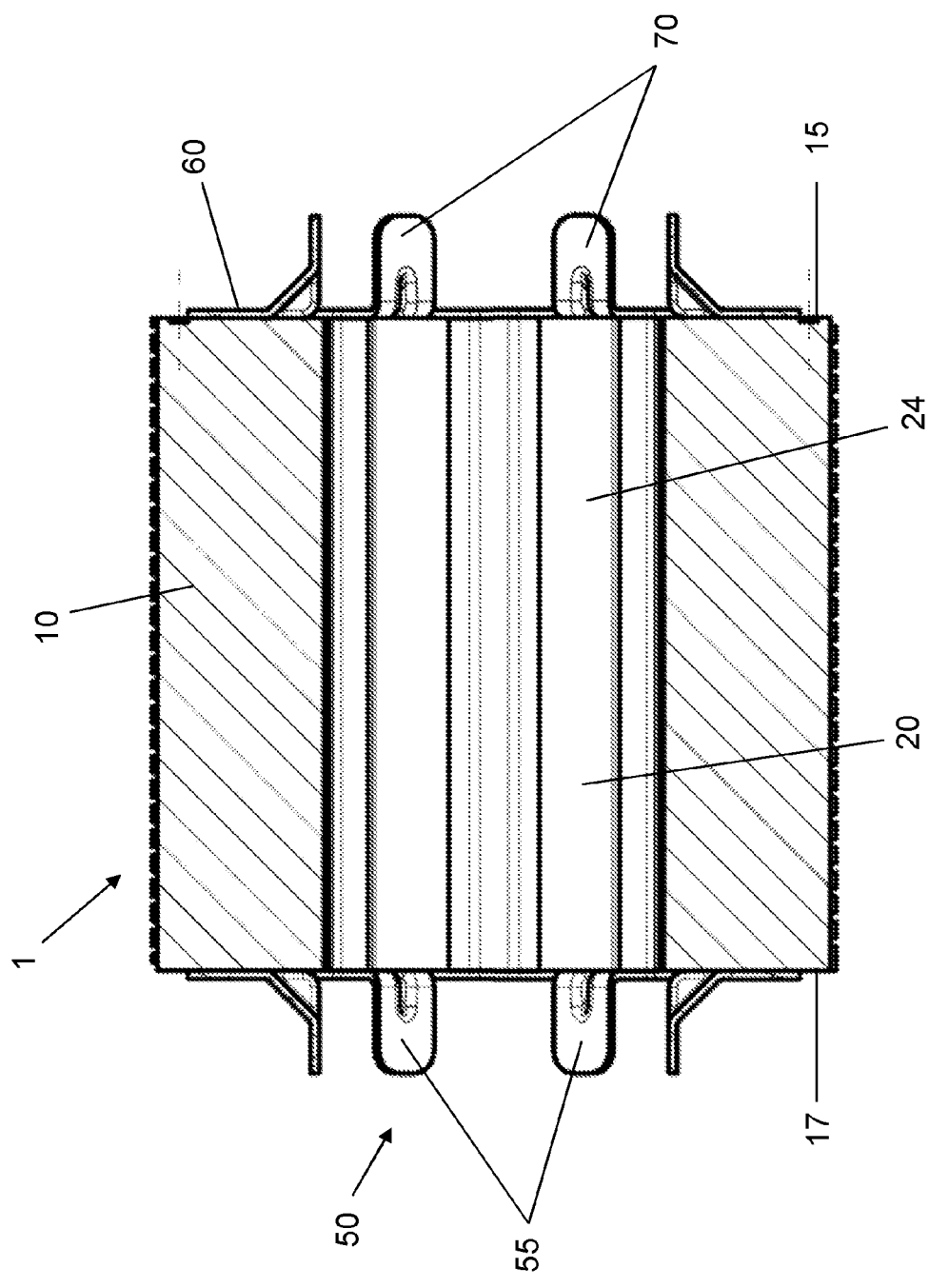
FIG. 3 is a sectional view along line A-A of FIG. 2.

According to FIGS. 13 to 16, the heat conductive support device 50 is a partially integral component of the web insulation 30. For this purpose, the heat conductive support device 50 is positioned at the first stator end 15 of the stator packet 10 (see. FIG. 1 to FIG. 3) in such a way that the first section 60 of the six support elements 55 of the support device 50 rests against the front side of the webs 24 of the stator packet 10. The second section 70 of the six support elements 55 extends towards the first stator end 15 of the stator packet 10.

The web insulation 30 consists of a plastic (alternatively another suitable material or even a combination of different materials can be used) and is sprayed on or applied to the inner surface 13 of the stator packet 10. In doing so, the web insulation 30 covers the entire inner surface 13 of the stator packet 10. The ends 32, 34 of the web insulation 30 protrude beyond the stator ends 15, 17 of the stator packet 10. As described above, and shown in FIG. 13, each of the six winding support elements 40 of the web insulation 30 surrounds one of the webs 24 of the stator packet 10. A not depicted wire for a coil winding is wrapped around each one of the six winding support elements 40. The first section 60 of the six support elements 55 of the support device 50 is thus between the front side of the webs 24 of the stator packet 10 and the winding support elements 40 of the web insulation 30, see FIGS. 15 and 16. In this way the first section 60 of the support elements 55 supports the winding support elements 40 of the insulating web 30 against the axially acting forces created by the wire tension of the winding. The hexagonal ring of the support device 50 rests against the stator end 15, 17 of the stator packet 10.

The second section 70 of the support elements 55 is integrated into the front end (i.e., which is in the direction of the first stator end 15 of the stator packet 10) of the carrier plate 44 of the winding support elements 40, to support the ends of this carrier plate 44 against the radially acting forces of the wire tension of winding, see. FIGS. 15 to 18.

In addition to the support function of the support device 50 against the wire tension forces of the winding, the support device 50 also fulfils a heat conducting function. The heat generated in the (not depicted) stator coil is conducted through the first sections 60 and the second sections 70 of the support elements 55 to the hexagonal ring of the support device 50. Since, as previously described, the hexagonal ring of the support device 50 rests against the stator ends 15, 17 of the stator packet 10, the generated heat can be dissipated to the outer surface 11 of the stator packet 10, so as to reduce the temperature in the stator coil and prevent possible damage.

The invention claimed is:
1. A stator for an electrodynamic machine comprising:
   a stator packet with a first stator end and a second stator end; and
   a web insulation with at least one winding support element to accommodate a stator coil
wherein a heat conductive support device with at least one support element is provided and the support element is disposed at least partially in the winding support element wherein each support element has a first section that extends in a first plane and a second section that extends in a second plane substantially perpendicular to the first plane and in a direction of a stator end.

2. The stator of claim 1 wherein a stiffening element is provided between the first section and the second section.

3. The stator of claim 1 wherein each support element is configured in the form of a curved contour, whereby in each case a free end of the support element extends in the direction of a stator end.

4. The stator of claim 1 wherein the heat conductive support device comprises at least one support device component, whereby each support device component comprises at least one support element.

5. The stator of claim 1 wherein the heat conductive support device is substantially configured as an annular sheet metal element.

6. The stator of claim 5 wherein the sheet metal element is configured as a stamped and bent component.

7. The stator of claim 1 wherein the heat conductive support device consists of a high-strength material.

* * * * *